United States Patent
Chapman

(10) Patent No.: US 9,264,575 B1
(45) Date of Patent: Feb. 16, 2016

(54) REAL TIME CORRELATION MARK IMAGES FOR LOW MEMORY DEVICES

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/717,548

(22) Filed: May 20, 2015

(51) Int. Cl.
*H04N 1/40* (2006.01)
*H04N 1/32* (2006.01)

(52) U.S. Cl.
CPC ......... *H04N 1/3232* (2013.01); *H04N 1/32208* (2013.01); *H04N 1/32267* (2013.01)

(58) Field of Classification Search
None
See application file for complete search history.

(56) References Cited

U.S. PATENT DOCUMENTS

| | | |
|---|---|---|
| 6,259,826 B1 | 7/2001 | Pollard et al. |
| 7,869,090 B2 | 1/2011 | Wang et al. |
| 8,009,329 B2 | 8/2011 | Bala et al. |
| 8,310,718 B2 | 11/2012 | Chapman et al. |
| 8,355,167 B2 | 1/2013 | Chapman et al. |
| 8,730,527 B2 | 5/2014 | Chapman et al. |
| 8,780,409 B2 | 7/2014 | Maltz et al. |
| 8,896,886 B2 | 11/2014 | Chapman et al. |
| 2010/0128290 A1 | 5/2010 | Fan et al. |
| 2010/0150433 A1* | 6/2010 | Wang ............. H04N 1/00864 382/162 |

OTHER PUBLICATIONS

"Correlation Marks," Xerox Technology—Technology Transfer at Xerox, printed Apr. 30, 2015, 2 pages.

* cited by examiner

*Primary Examiner* — Nicholas Pachol
*Assistant Examiner* — Christopher D Wait
(74) *Attorney, Agent, or Firm* — Kermit D. Lopez; Luis M. Ortiz; Ortiz & Lopez, PLLC

(57) ABSTRACT

Methods and systems for providing real time correlation mark images and/or gloss marks. A new font can be created with respect to a prior font, wherein the new font includes a wider foreground than that of the prior font while maintaining the spatial frequency associated with the prior font (one time per font). The new font is then modified to include an inverted modified font by inverting each glyph one time per font and providing an image having the new font. The image is then written and the current color associated with the image is set to white (or to knockout). An operation is then implemented to write on top of the image using the new font.

20 Claims, 9 Drawing Sheets

REAL TIME CORRELATION MARK IMAGES FOR LOW MEMORY DEVICES

TECHNICAL FIELD

Embodiments are generally related to the field of digital imaging. Embodiments also relate to the protection of documents via security measures and preventing the counterfeiting of printed materials.

BACKGROUND OF THE INVENTION

Security is an important concern in the realm of documents and digital production and/or reproduction of the same. Known digital image printing/copying systems produce documents of such high quality that a need has been identified to prevent effective printing/copying of certain documents such as high-value printed items including tickets, financial instruments, security passes, pharmaceutical prescriptions, and the like. Known techniques include printing the original document in a manner such that it includes a "watermark," using only conventional paper and toner or ink. One such watermarking technique that has been developed and is known to increase document security involves the use and implementation of correlation marks.

Correlation marks offer a unique and simple method for protecting and tracking documents. Based on digital screening technology, correlation marks take advantage of spatial correlations in halftone screens to create a self-authenticating, secure document containing an invisible, hidden image. Using correlation marks, invisible images can be hidden within a normal, visible image, such as a photograph, using specially designed halftone screens. The halftone screens utilized to embed the correlation marks can be used like any traditional halftone screen, no additional image processing is required.

Different from digital watermarking technology, correlation mark technology hides an invisible image during the printing process. No alteration to the original image data is required. And because the hidden mark is inserted during the printing process, each copy of a document can have a unique hidden image.

Hidden images made using correlation marks technology are not visible to the human eye. Such hidden images can be detected either by scanning and processing the printed image or by overlaying a transparency containing a 'key' on top of the document to reveal the hidden image. Correlation marks are thus robust to copying and distortion and can be detected in reproductions of the halftone image.

In the area of document security, documents are protected from copying, forging, and counterfeiting using multiple techniques including, but not limited to, watermarking, correlation marks, etc. One approach for document protection involves using standard material such as papers, inks, toners, etc. Typically, however, most security printing companies in the marketplace require special (and expensive) materials. One example of a document requiring security is a prescription where a pharmacist would like to be able to have a high level of confidence that the document is genuine.

The correlation marks shown in FIGS. 1 and 2 are examples of a document security technique that requires a screen or a key to decode. FIG. 1 illustrates a prior art image 1 of correlation marks located above barcodes, and FIG. 2 illustrates a prior art image 2 of correlation marks with respect to a screen.

The approach shown in FIGS. 1-2 generally involves modifying an image to compensate for a lightning effect in later processing steps (the image only needs to be sent to a device one time), creating a pattern ink with the image, adding a vertical and horizontal white space to the image, setting the pattern ink to be the current color (anything written will write in the image with the white space), and writing a gloss (or correlation) mark variable text until the entire image is written. The last step can be repeated N times once per variable data.

One of the primary problems with this approach, however, is that although this technique does work in some production devices and work flows, when implemented in newer applications, this technique fails with an out-of-memory error with respect to target office devices. This problem is caused because the pattern caches (e.g., memory) were not designed for the images from the steps above. Increasing the pattern cache or avoid using it does not solve the issues.

It is therefore believed that an improved correlation mark technique is needed to overcome these problems.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved method and system for providing real time correlation and gloss mark images that is not memory intensive.

It is another aspect of the disclosed embodiments to provide for a method and system for creating real time correlation and gloss mark images involving two font modifications, image modification, and writing of a modified font in a knockout mode.

The aforementioned aspects and other objectives and advantages can now be achieved as described herein. Methods and systems are disclosed for providing real time correlation mark images. A new font can be created with respect to a prior font, wherein the new font includes a wider foreground than that of the prior font while maintaining the spatial frequency associated with the prior font (one time per font). The new font is then modified to include an inverted modified font by inverting each glyph one time per font and providing an image having the new font. The image is then written and the current color associated with the image is set to white (or to knockout). An operation is then implemented to write on top of the image using the new and inverted modified font.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

Reference will now be made in detail to the present embodiments exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Figure 1:
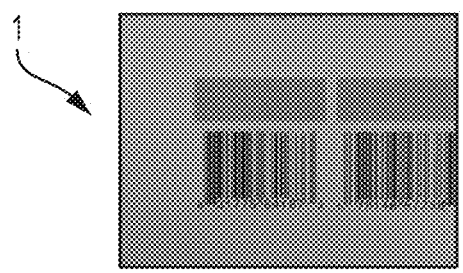
FIG. 1 illustrates a prior art image of correlation marks located above barcodes.
Figure 2:
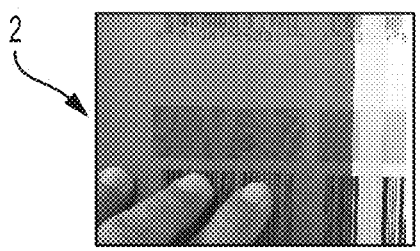
FIG. 2 illustrates a prior art image of correlation marks with respect to a screen.
Figure 3:
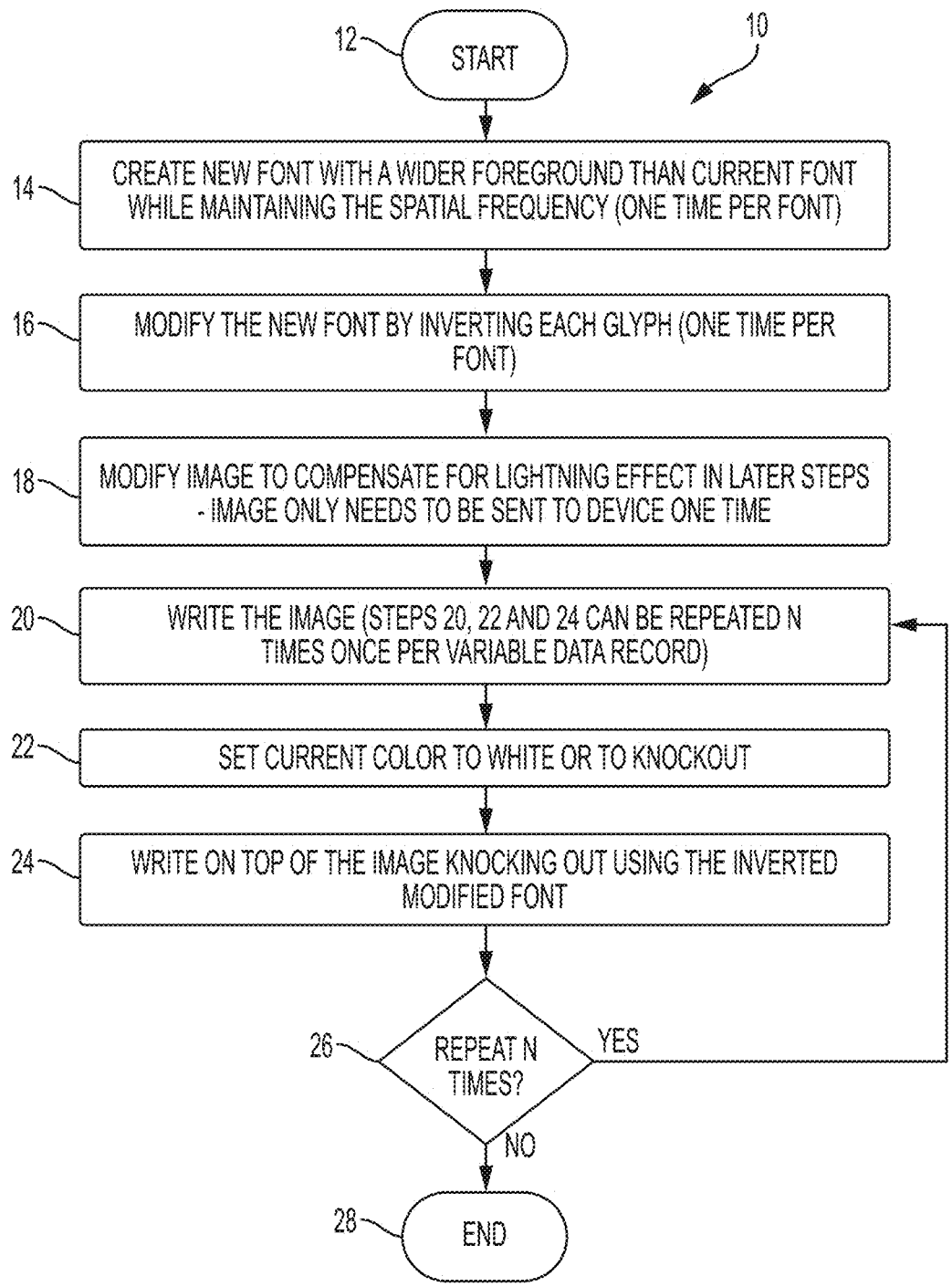
FIG. 3 illustrates a flow chart of operations depicting logical steps of a method for the creation of real time correlation mark images for low memory devices, in accordance with a preferred embodiment.

FIG. 3 illustrates a flow chart of operations depicting logical steps of a method 10 for the creation of real time correlation mark images for low memory devices, in accordance with a preferred embodiment. Note that although method 10 is discussed in the context of correlation marks, this approach works equally well for gloss or correlation. The method 10 shown in FIG. 3 can result in the creation of real time correlation and/or gloss mark images in a manner that is not memory intensive and which will function on target devices. Method 10 generally involves two font modifications, one image modification and writing the modified font in a knockout mode. One font modification (e.g., see block 14) improves image quality. Another font modification (e.g., see block 16) allows for the functioning of a knockout mode as discussed in more detail herein. Thus, only one font modification (e.g., a thicker foreground) need be implemented to improve image quality over prior approaches. Note that the operations shown at blocks 14 and 18 improve image quality. To create 1000 diplomas with 1000 variable data strings, for example, however, only one image is required (e.g., see the overall flow/operations of method 10).

Note that as utilized herein, the term knockout (e.g., knockout mode) refers to a portion of an image that has been removed. When two colors overlap, for example, they do not normally print on top of each other. For example, the bottom color is knocked out of—not printed—the area where the other color overlaps. If the overlapping colors were printed, a portion of the image could be potentially over-saturated with ink and could also affect the color of the image. Knockout type is typically text that is knocked out or reversed out of a dark background so that the type appears in the color of the paper.

As indicated at block 12, the process is initiated. Next, as shown at block 14, a step or logical operation can be implemented in which a new font is created with a wider foreground than a current font, while maintaining the spatial frequency (one time per font). Thereafter, as depicted at block 16, a step or logical operation can be processed in which the new font is modified by inverting each glyph (one time per font). Then, as shown at block 18, a step or logical operation can be implemented to modify the image to compensate for lightning effect in later steps operations. That is, the image only needs to be sent to a device one time.

Next, as depicted at block 20, a step or operation can be implemented to write the image. Note that the operations shown at steps 20, 22, and 24 can be repeated N times once per variable data record. As depicted next at block 22, a step or operation can be processed to set the current color to white or to knockout. Then, as indicated at block 24, a step or local operation can be provided to write on top of the image knocking out using the inverted modified font. Following the processing of the operation shown at block 24, a test can be determined, as depicted at block 26, to determine if the operations depicted at blocks 20, 22, and 24 have been repeated N times. If so, the process can terminate, as illustrated at block 28. In a preferred example embodiment, the loop of instructions or operations depicted at blocks 20, 22, and 24 can run on a printer such as, for example, the printing device 204 depicted in FIG. 11.

Not only does the approach of method 10 solve the memory issue discussed previously, but additionally provides better quality images as compared to prior art approaches, due to the operation shown at block 14, which allows more of the original image to remain. Each of these operations will now be explained in more detail with a figure showing the particular step.

This approach can be summarized as follows according to these steps:

1) Create new font with a wider foreground than current font maintaining the spatial frequency (one time per font).
2) Modify the new font by inverting each glyph (one time per font).
3) Modify the image to compensate for lightning effect in later steps—i.e., the image only needs to be sent to a device one time.
4) Write the image (*note steps 4-6 are repeated N times once per variable data record).
5) Set current color to white or to knockout.
6) Write on top of the image knocking out using our inverted modified font.

Not only does this approach solve the memory issue, but also provides better quality images as compared to prior techniques, due to the fact that this approach allows more of the original image to remain.

Figure 4:
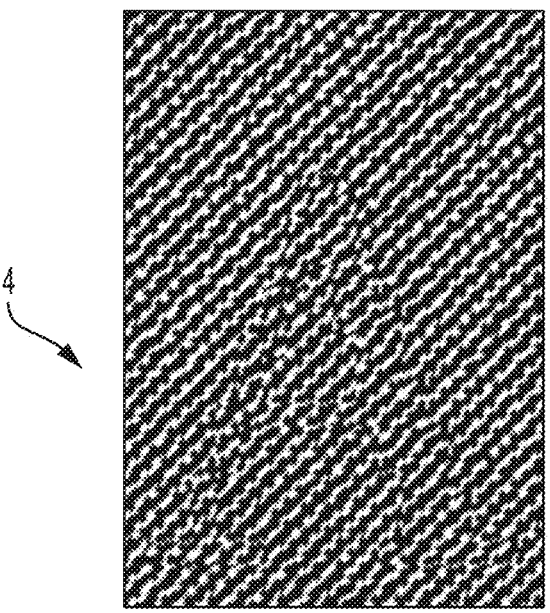
FIG. 4 illustrates an image of an example correlation glyph or mark "A"
Figure 5:
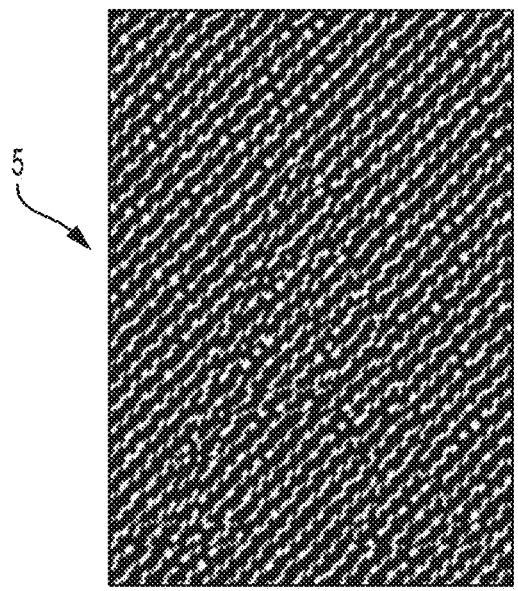
FIG. 5 illustrates an image having a new font created with wider foreground and smaller background compared to the current font shown in FIG. 4, in accordance with an embodiment.

FIG. 4 illustrates an image 4 of an example correlation glyph or mark "A". FIG. 5 illustrates an image 5 having a new font created with wider foreground and smaller background compared to the current font shown in FIG. 4, in accordance with an embodiment. As shown by image 5 in FIG. 5, a new font is created with a wider foreground (black area) and smaller background (white area) as compared to the current font shown in image 4 of FIG. 4. The center of both the foreground and background is the same for both fonts meaning the frequency is identical. This demonstrates one glyph in the entire font with respect to, for example, the operation shown block 14 of FIG. 3 or step 1 referred to above, wherein a new font is created with a wider foreground than the current font while maintaining the spatial frequency (one time per font).

Figure 6:
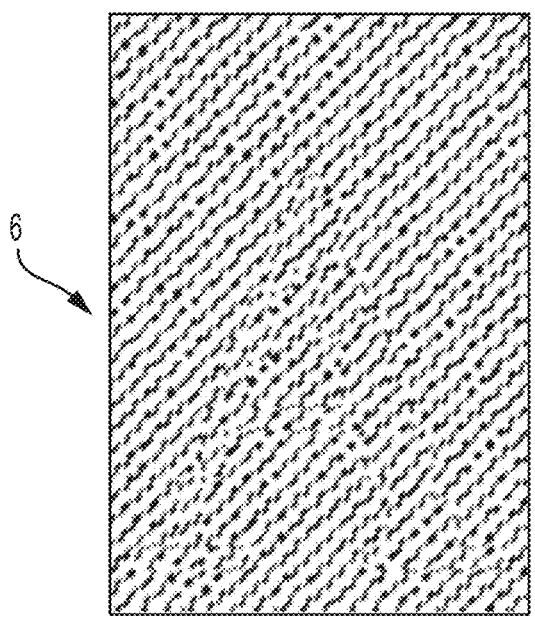
FIG. 6 illustrates an image of a glyph with the new font depicted in FIG. 5, but inverted, in accordance with an embodiment.

FIG. 6 illustrates an image 6 of a glyph with the new font depicted in FIG. 5, but inverted, in accordance with an embodiment. The image 6 shown in FIG. 6 is related to the operation depicted in block 16 of FIG. 3 or step 2 described above.

Figure 7A:
FIGS. 7A and 7B illustrate an imaged darkened one time, in accordance with an embodiment.
Figure 7B:

FIGS. 7A and 7B illustrate an imaged darkened one time, in accordance with an embodiment. That is the image 17 is shown in FIG. 7A prior to the darkening effect. Image 19 shown in FIG. 7B represents the same image 17 after subjected to the darkening operation. Note that the operation demonstrated by FIGS. 7A and 7B is an optional step that can improve the image quality by darkening the image one time. This operation corresponds to step 3 described above and block 18 shown in FIG. 3.

Figure 8:
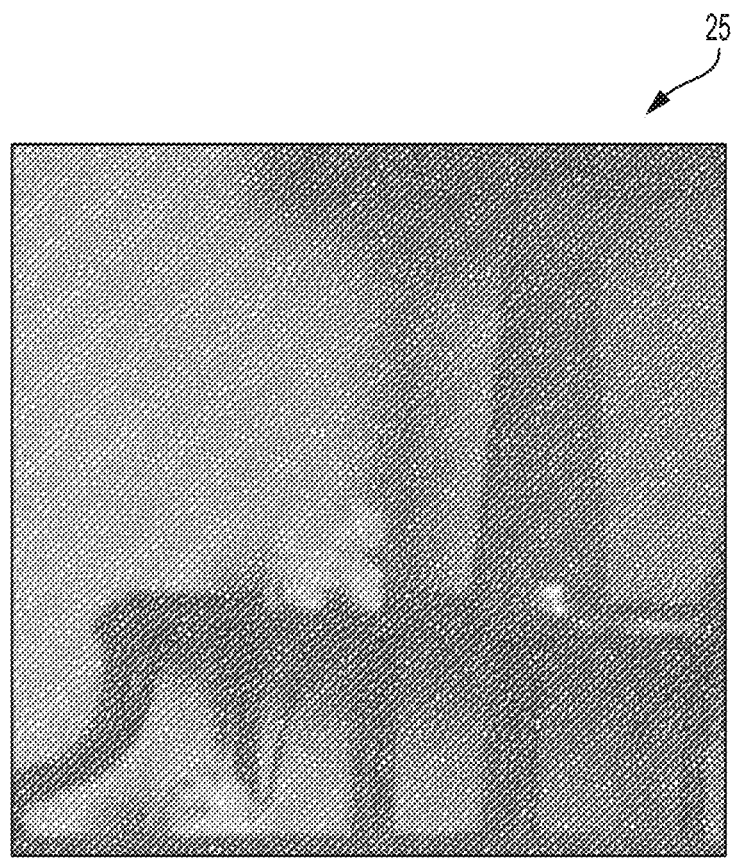
FIG. 8 illustrates a zoomed-in view of an image, in accordance with an embodiment.
Figure 9:
FIG. 9 illustrates the same example image depicted in FIG. 8 having a screen on top, in accordance with an embodiment.

The color can then be set to white and the variable text knocks out the image with the font from, for example, FIG. 6. This repeats for all variable data records. FIG. 8 illustrates a zoomed-in view of an image 25, in accordance with an embodiment. FIG. 9 illustrates the same example image 25 having a screen on, in accordance with an example embodiment. Note that the image 19 depicted in FIG. 7B can be written. FIGS. 8-9 depict the same image 25, with the FIG. 8 image zoomed in to show detail and the FIG. 9 having a screen over the right side. Note that the text is available in the entire image, but the glare shown in image 25 of FIG. 9 washes it out in that region.

It can thus be appreciated that the disclosed approach creates real time correlation and gloss mark images in a manner that is not memory intensive (unlike prior approaches) and which will work on target devices. This unique approach involves two font modifications, one image modification and writing the modified font in a knockout mode. One of the font modifications increases image quality over prior approaches. To create 1000 diplomas with 1000 variable data strings with this approach, for example, only one image is required.

Figure 10:
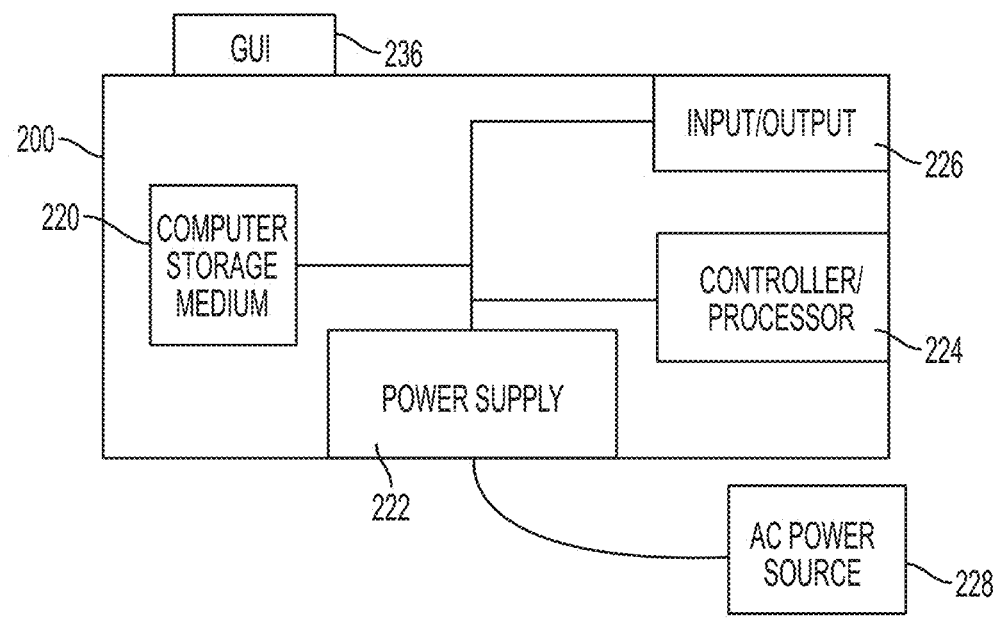
FIG. 10 is a side-view schematic diagram of a device according to embodiments herein.

FIG. 10 illustrates a computerized device 200, which can be used with embodiments herein and can comprise, for example, a print server, a personal computer, a portable computing device, etc. The computerized device 200 includes a controller/processor 224 (e.g., the "device processor") and a communications port (input/output) 226 operatively connected to the device processor 224 and to a computerized network external to the computerized device 200. Also, the computerized device 200 can include at least one accessory functional component, such as a graphic user interface assembly 236 that also operates on the power supplied from the external power source 228 (through the power supply 222).

The input/output device 226 can be used for communications to and from the computerized device 200. The device processor 224 controls the various actions of the computerized device. A non-transitory (non-volatile) computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 10, a body housing 200 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

Figure 11:
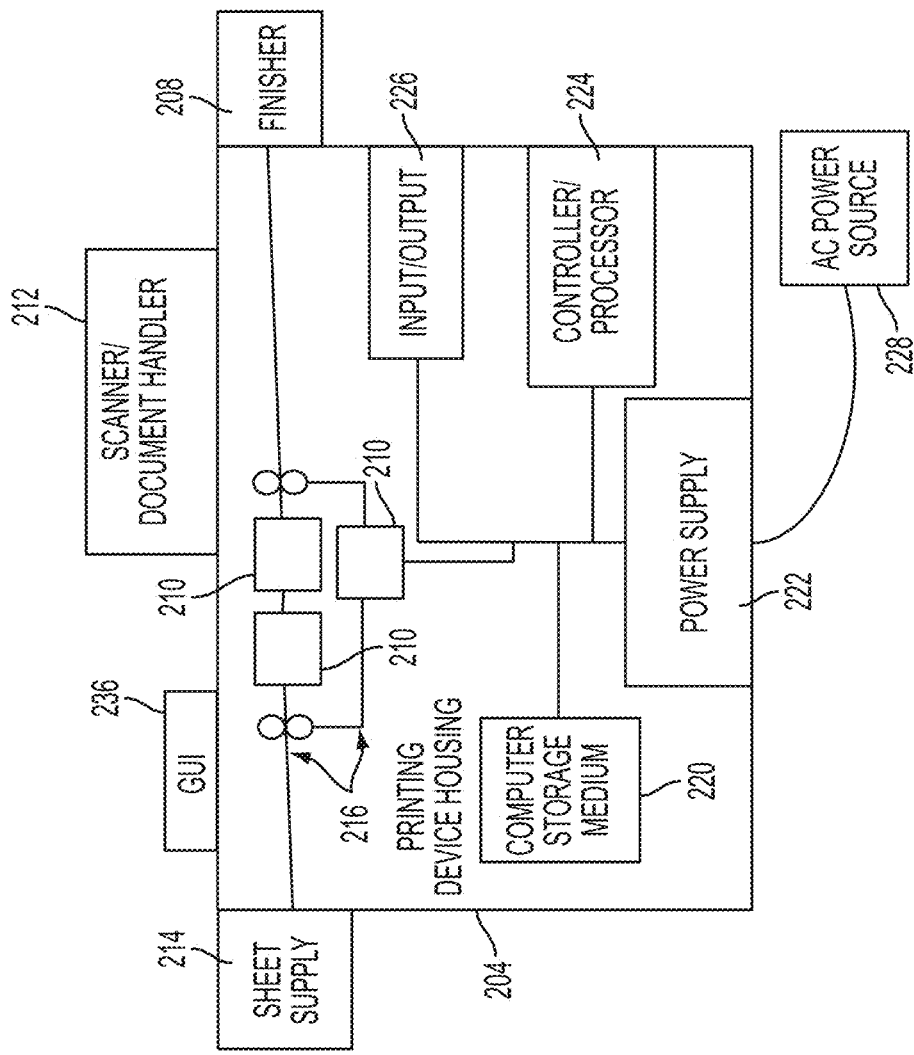
FIG. 11 is a side-view schematic diagram of a device according to embodiments herein.

FIG. 11 illustrates a computerized device that is a printing device 204, which can be used with one or more embodiments herein and can comprise, for example, a printer, copier, multi-function machine, multi-function device (MFD), etc. The printing device 204 can include many of the components mentioned above and one or more printing engine(s) 210 operatively connected to the device processor 224, a media path 216 positioned to supply sheets of media from a sheet supply 214 to the printing engine 210, etc. After receiving various markings from the printing engine(s), the sheets of media can optionally pass to a finisher 208 which can fold, staple, sort, etc., the various printed sheets. Also, the printing device 204 can include at least one accessory functional component (e.g., a scanner/document handler 212, etc.) that also operates on the power supplied from the external power source 228 (i.e., through the power supply 222).

Many computerized devices are discussed above. Computerized devices that include chip-based central processing units (CPU's), input/output devices (including graphic user interfaces (GUI), memories, comparators, processors, etc., are well-known and readily available devices produced by manufacturers such as, for example, Dell Computers of Round Rock, Tex., USA and Apple Computer Co. of Cupertino, Calif., USA. Such computerized devices commonly include input/output devices, power supplies, processors, electronic storage memories, wiring, etc., the details of which are omitted herein to allow the reader to focus on the salient aspects of the embodiments described herein. Similarly, scanners and other similar peripheral equipment are available from, for example, Xerox Corporation of Norwalk, Conn., USA. The details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well known by those ordinarily skilled in the art. The embodiments herein can encompass embodiments that print in color, monochrome, or handle color or monochrome image data. All foregoing embodiments are specifically applicable to electrostatographic and/or xerographic machines and/or other rendering processes.

As can be appreciated by one skilled in the art, embodiments can be implemented in the context of a method, data processing system, or computer program product. Accordingly, embodiments may take the form of an entire hardware embodiment, an entire software embodiment, or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, 802.xx, and cellular network or the connection may be made to an external computer via most third party supported networks (for example, through the Internet utilizing an Internet Service Provider).

The embodiments are described at least in part herein with reference to flowchart illustrations, images, graphics, and/or block diagrams of methods, systems, and computer program products and data structures according to embodiments of the invention. It will be understood that each block of the illustrations, and combinations of blocks, and/or lines of pseudo-code can be implemented by computer program instructions. These computer program instructions may be provided to a processor of a general-purpose computer, special purpose computer, or other programmable data processing apparatus to produce a machine, such that the instructions, which execute via the processor (e.g., controller/processor 224 depicted in FIGS. 10-11) of the computer or other programmable data processing apparatus, create means for implementing the functions/acts specified in the block or blocks.

Examples of instructions or steps/operations, which may be executed via the controller/processor 224 shown in FIGS. 10-11 include, but are not limited to, those shown and described herein with respect to blocks 12, 14, 16, 18, 20, 22, 24, 26, 28 of method 10 depicted in FIG. 3.

These computer program instructions may also be stored in a computer-readable memory (e.g., computer storage medium 220 shown in FIGS. 10-11), which can direct a computer or other programmable data processing apparatus to function in a particular manner, such that the instructions stored in the computer-readable memory produce an article of manufacture including instruction means which implement the function/act specified in the block or blocks.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines: and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Based on the foregoing it can be appreciated that a number of preferred and alternative embodiments are disclosed herein. For example, in one embodiment a method can be implemented to provide real time correlation mark images. Such a method can include, for example, steps or operations for creating a new font with respect to a prior font; modifying the new font to comprise an inverted modified font by inverting each glyph among a plurality of glyphs one time per font and providing one or more images having the new font; writing the image; setting a current color associated with the image to white; and writing on top of the image using the new font comprising the inverted modified font to produce one or more correlation mark images or gloss mark images with respect to the image (or images).

In some embodiments, a step or operation can be implemented for modifying the image(s) to compensate for lighting effects. In another embodiment, step or operation of creating a new font with respect to a prior font can further involve creating the new font with respect to the prior font, wherein the new font includes a wider foreground than that of the prior font while maintaining a spatial frequency associated with the prior font one time per font.

In another embodiment, a step or operation can be implemented for rendering the correlation mark image or the gloss image via a printing device. In still another embodiment, a step or operation can be provided for repeating N times the following steps: writing the image; setting the current color associated with the image to white; and writing on top of the image using the new font comprising the inverted modified font to produce the correlation mark image or the gloss mark with respect to the image. In still another embodiment, the step or operation of setting a current color associated with the image to white can further involve setting the current color associated with the image to white or knockout.

In still another embodiment, a system can be provided for providing real time correlation mark images. Such a system can include, for example, at least one processor and a non-transitory computer-usable medium embodying computer program code, the computer-usable medium capable of communicating with the processor(s). The computer program code includes instructions executable by the processor(s) and configured for example, for: creating a new font with respect to a prior font; modifying the new font to comprise an inverted modified font by inverting each glyph among a plurality of glyphs one time per font and providing one or more images having the new font writing the image; setting a current color associated with the image to white; and writing on top of the image using the new font comprising the inverted modified font to produce one or more correlation mark images or gloss marks with respect to the image.

In yet another embodiment, a non-transitory processor readable storage medium having stored thereon processor-executable software instructions can be configured to cause a device processor to perform operations comprising, for example, creating a new font with respect to a prior font; modifying the new font to comprise an inverted modified font by inverting each glyph among a plurality of glyphs one time per font and providing an image (or images) having the new font; writing the image; setting a current color associated with the image to white; and writing on top of the image using the new font comprising the inverted modified font to produce at least one correlation mark image or a gloss mark with respect to the image.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

The invention claimed is:

1. A method for providing real time correlation mark images, said method comprising:
   creating a new font with respect to a prior font;
   modifying said new font to comprise an inverted modified font by inverting each glyph among a plurality of glyphs one time per font and providing at least one image having said new font;
   writing said at least one image;
   setting a current color associated with said at least one image to white; and
   writing on top of said at least one image using said new font comprising said inverted modified font to produce at least one correlation mark image or a gloss mark with respect to said at least one image.

2. The method of claim 1 further comprising modifying said at least one image to compensate for lighting effects.

3. The method of claim 1 wherein the step of creating a new font with respect to a prior font, further comprises:
   creating said new font with respect to said prior font, wherein said new font includes a wider foreground than that of said prior font while maintaining a spatial frequency associated with said prior font one time per font.

4. The method of claim 1 further comprising rendering said at least one correlation mark image or said gloss image via a printing device.

5. The method of claim 1 further comprising repeating N times the following steps:
   writing said at least one image;
   setting said current color associated with said at least one image to white; and
   writing on top of said at least one image using said new font comprising said inverted modified font to produce said at least one correlation mark image or said gloss mark with respect to said at least one image.

6. The method of claim 1 further comprising:
   modifying said at least one image to compensate for lighting effects; and
   wherein the step of creating a new font with respect to a prior font, further comprises creating said new font with respect to said prior font, wherein said new font includes a wider foreground than that of said prior font while maintaining a spatial frequency associated with said prior font one time per font.

7. The method of claim 6 further comprising repeating N times the following steps:
   writing said at least one image;
   setting said current color associated with said at least one image to white; and
   writing on top of said at least one image using said new font comprising said inverted modified font to produce said at least one correlation mark image or said gloss mark with respect to said at least one image.

8. The method of claim 1 wherein the step of setting a current color associated with said at least one image to white, further comprises:
   setting said current color associated with said at least one image to white or knockout.

9. A system for providing real time correlation mark images, said system comprising:
   at least one processor; and
   a computer-usable medium embodying computer program code, said computer-usable medium capable of communicating with said at least one processor, said computer program code comprising instructions executable by said at least one processor and configured for:
   creating a new font with respect to a prior font;
   modifying said new font to comprise an inverted modified font by inverting each glyph among a plurality of glyphs one time per font and providing at least one image having said new font;
   writing said at least one image;
   setting a current color associated with said at least one image to white; and
   writing on top of said at least one image using said new font comprising said inverted modified font to produce at least one correlation mark image or a gloss mark with respect to said at least one image.

10. The system of claim 9 wherein said instructions are further configured for modifying said at least one image to compensate for lighting effects.

11. The system of claim 9 wherein said instruction for creating a new font with respect to a prior font, further comprises instructions configured for:
   creating said new font with respect to said prior font, wherein said new font includes a wider foreground than that of said prior font while maintaining a spatial frequency associated with said prior font one time per font.

12. The system of claim 9 wherein said instructions are further configured for repeating N times the following steps:
   writing said at least one image;
   setting said current color associated with said at least one image to white; and
   writing on top of said at least one image using said new font comprising said inverted modified font to produce said at least one correlation mark image or said gloss mark with respect to said at least one image.

13. The system of claim 12 wherein said instructions are further configured for:

modifying said at least one image to compensate for lighting effects; and creating said new font with respect to said prior font, wherein said new font includes a wider foreground than that of said prior font while maintaining a spatial frequency associated with said prior font one time per font.

14. The system of claim 13 wherein said instructions are further configured for repeating N times the following steps:

writing said at least one image;

setting said current color associated with said at least one image to white; and writing on top of said at least one image using said new font comprising said inverted modified font to produce said at least one correlation mark image or said gloss mark with respect to said at least one image.

15. The system of claim 9 wherein said instructions for setting a current color associated with said at least one image to white are further configured for:

setting said current color associated with said at least one image to white or knockout.

16. The system of claim 9 wherein said instructions are further configured for rendering said at least one correlation mark image or said gloss image via a printing device.

17. A non-transitory processor readable storage medium having stored thereon processor-executable software instructions configured to cause a device processor to perform operations comprising:

creating a new font with respect to a prior font;

modifying said new font to comprise an inverted modified font by inverting each glyph among a plurality of glyphs one time per font and providing at least one image having said new font;

writing said at least one image;

setting a current color associated with said at least one image to white; and writing on top of said at least one image using said new font comprising said inverted modified font to produce at least one correlation mark image or a gloss mark with respect to said at least one image.

18. The non-transitory processor readable storage medium of claim 17, wherein the stored processor-executable software instructions are configured to cause the device processor to perform operations further comprising:

modifying said at least one image to compensate for lighting effects.

19. The non-transitory processor readable storage medium of claim 17 wherein the stored processor-executable software instructions are configured to cause the device processor to perform operations further comprising:

creating said new font with respect to said prior font, wherein said new font includes a wider foreground than that of said prior font while maintaining a spatial frequency associated with said prior font one time per font.

20. The non-transitory processor readable storage medium of claim 17 wherein the stored processor-executable software instructions are configured to cause the device processor to perform operations further comprising:

rendering said at least one correlation mark image or said gloss image via a printing device.

\* \* \* \* \*